US010859827B2

(12) United States Patent
Hisatsugu et al.

(10) Patent No.: US 10,859,827 B2
(45) Date of Patent: Dec. 8, 2020

(54) COMBINER AND HEAD-UP DISPLAY DEVICE

(71) Applicant: DENSO CORPORATION, Aichi (JP)

(72) Inventors: Shinsuke Hisatsugu, Kariya (JP); Hiroshi Katayama, Kariya (JP)

(73) Assignee: DENSO CORPORATION, Aichi (JP)

( * ) Notice: Subject to any disclaimer, the term of this patent is extended or adjusted under 35 U.S.C. 154(b) by 164 days.

(21) Appl. No.: 16/080,031

(22) PCT Filed: Jan. 24, 2017

(86) PCT No.: PCT/JP2017/002211
§ 371 (c)(1),
(2) Date: Aug. 27, 2018

(87) PCT Pub. No.: WO2017/150001
PCT Pub. Date: Sep. 8, 2017

(65) Prior Publication Data
US 2019/0061638 A1 Feb. 28, 2019

(30) Foreign Application Priority Data
Feb. 29, 2016 (JP) ................................. 2016-037256

(51) Int. Cl.
*G02B 27/01* (2006.01)
*B60K 35/00* (2006.01)
*B60R 11/02* (2006.01)

(52) U.S. Cl.
CPC .......... *G02B 27/0149* (2013.01); *B60K 35/00* (2013.01); *B60R 11/02* (2013.01);
(Continued)

(58) Field of Classification Search
CPC ..................... G02B 27/1049; B60R 11/0229
See application file for complete search history.

(56) References Cited

U.S. PATENT DOCUMENTS 6,618,203 B2 * 9/2003 Nakamura .......... G02B 27/0149
345/7
10,310,263 B2 * 6/2019 Nakayama ......... G02B 27/0149
(Continued)

FOREIGN PATENT DOCUMENTS

JP 2010525987 A 7/2010
JP 2015004927 A 1/2015
(Continued)

*Primary Examiner* — Zachary W Wilkes
(74) *Attorney, Agent, or Firm* — Harness, Dickey & Pierce, P.L.C.

(57) ABSTRACT

A combiner is fastened to a base in a mobile object with a fastening member having a planar seat surface. The combiner displays a display light image as a virtual image visible to an occupant in the mobile object when the display light image is projected from a projection unit. The combiner includes a projection main body and a fastening protrusion. The projection main body is set with a projection region and has reflection surfaces displaying a virtual image by reflecting the display light image projected onto the projection region in a shape of a curved surface. The fastening protrusion has a planar fastening surface in surface contact with the seat surface. The fastening protrusion protrudes from the projection main body and is fastened to the base with the fastening member inserted into the fastening protrusion.

13 Claims, 9 Drawing Sheets

(52) U.S. Cl.
CPC .......... *B60R 11/0229* (2013.01); *G02B 27/01* (2013.01); *B60K 2370/334* (2019.05)

(56) References Cited

U.S. PATENT DOCUMENTS

| | | |
|---|---|---|
| 10,365,484 B2 * | 7/2019 | Ogiwara ................ G02B 1/115 |
| 2010/0157431 A1 | 6/2010 | Montarou et al. |
| 2015/0212323 A1 | 7/2015 | Kobayashi et al. |
| 2016/0178900 A1 | 6/2016 | Kawaguchi |

FOREIGN PATENT DOCUMENTS

| | | |
|---|---|---|
| JP | 2015087202 A | 5/2015 |
| JP | 2015212780 A | 11/2015 |
| KR | 20140148398 A | 12/2014 |

* cited by examiner

COMBINER AND HEAD-UP DISPLAY DEVICE

CROSS REFERENCE TO RELATED APPLICATIONS

This application is a U.S. National Phase Application under 35 U.S.C. 371 of International Application No. PCT/JP2017/002211 filed on Jan. 24, 2017 and published in Japanese as WO/2017/150001 A1 on Sep. 8, 2017. This application is based on and claims the benefit of priority from Japanese Patent Application No. 2016-037256 filed on Feb. 29, 2016. The entire disclosures of all of the above applications are incorporated herein by reference.

TECHNICAL FIELD

The present disclosure relates to a combiner and to a head-up display device.

BACKGROUND ART

A widely known head-up display device (hereinafter, referred to as an HUD device for short) is configured to display a display light image as a virtual image visible to an occupant in a mobile object by projecting the display light image onto a combiner, such as an expansion mirror, from a projection unit.

A combiner of the HUD device is fastened to a base in the mobile object and is used as is described in, for example, Patent Literature 1. The base disclosed in Patent Literature 1 can be driven in multiple positions.

For the combiner disclosed in Patent Literature 1 to ensure clear visibility of a display light image displayed as a virtual image by reducing rattling caused by vibrations of the mobile body and the base to a lesser extent, the combiner needs to be firmly fixed by inserting fastening members, such as screw members, into the combiner. In the combiner disclosed in Patent Literature 1, however, reflection surfaces reflecting a display light image are formed in a shape of a curved surface, which raises another concern as follows. Specifically, a seat surface of the fastening member, such as a seat surface at a head of the screen member, is formed in a planar shape and makes line contact or point contact with one of the curved refection surfaces of the combiner. Hence, distortion readily occurs in the combiner which receives fastening stress at the curved reflection surface. Distortion occurring at the curved reflection surface would impair clear visibility of a display light image and is therefore by no means desirable.

PRIOR TECHNICAL LITERATURE

Patent Literature

Patent Literature 1: JP 2010-525987 A

SUMMARY OF INVENTION

The present disclosure has an object to provide a combiner and an HUD device configured to produce clear visibility of a display light image.

According to one aspect of the present disclosure, a combiner is configured to be fastened to a base in a mobile object with a fastening member having a planar seat surface and to display a display light image as a virtual image visible to an occupant in the mobile object when the display light image is projected from a projection unit. The combiner comprises a projection main body set with a projection region and having reflection surfaces each in a shape of a curved surface and configured to display a virtual image by reflecting the display light image projected onto the projection region. The combiner further comprises a fastening protrusion having a planar fastening surface configured to be in contact with the seat surface. The fastening protrusion protrudes from the projection main body and is configured to be fastened to the base with the fastening member inserted into the fastening protrusion.

According to another aspect of the present disclosure, a head-up display device includes a combiner configured to be fastened to a base in a mobile object with a fastening member having a planar seat surface and to display a display light image as a virtual image visible to an occupant in the mobile object by projecting the display light image onto the combiner from a projection unit. The combiner includes a projection main body set with a projection region and having reflection surfaces each in a shape of a curved surface and configured to display a virtual image by reflecting the display light image projected onto the projection region. The combiner further includes a fastening protrusion having a planar fastening surface configured to be in surface contact with the seat surface. The fastening protrusion protrudes from the projection main body and is configured to be fastened to the base with the fastening member inserted into the fastening protrusion.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
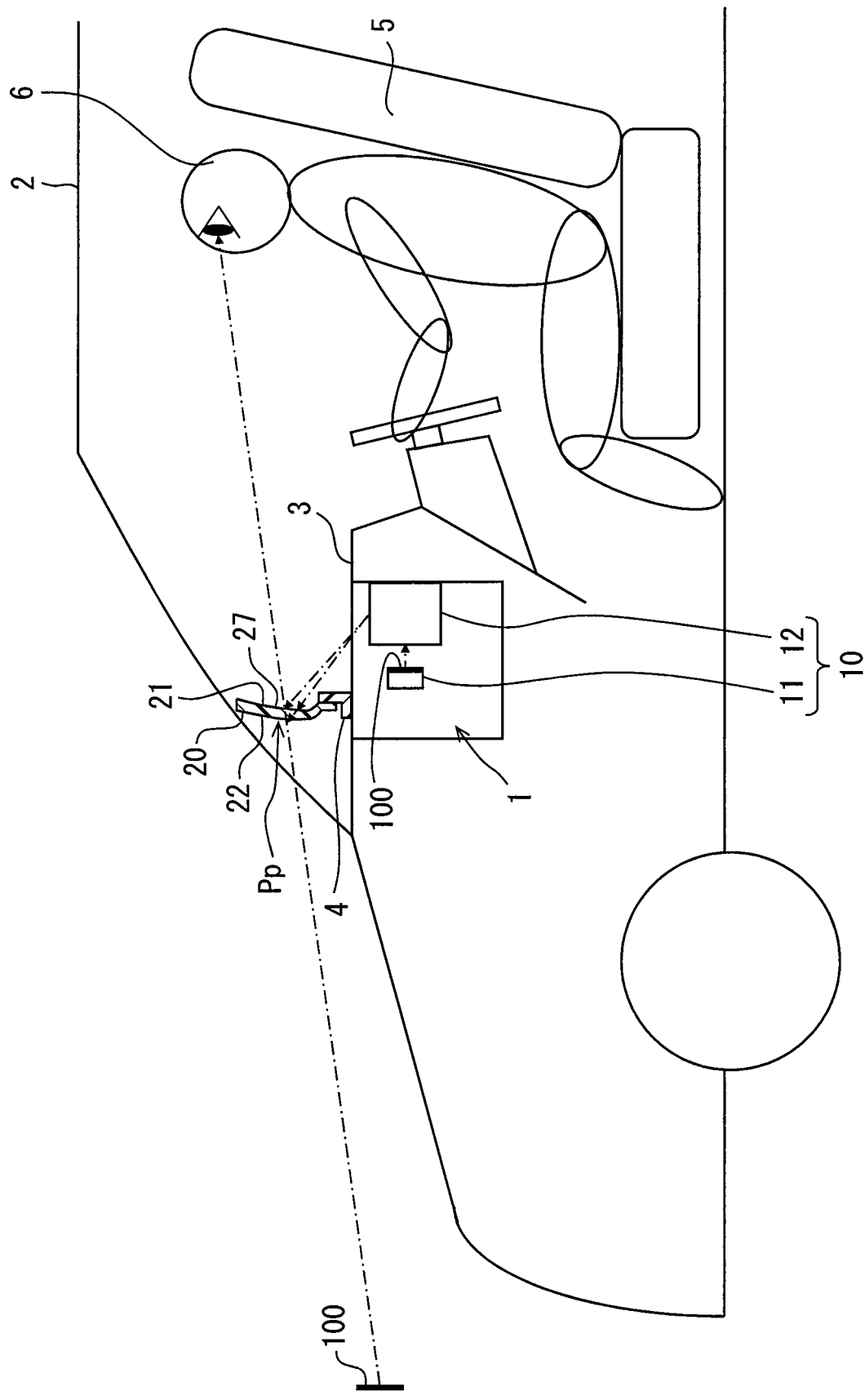
FIG. 1 is a schematic sectional view showing a configuration of an HUD device including a combiner according to one embodiment.

As is shown in FIG. 1, an HUD device 1 according to one embodiment of the present disclosure is mounted to a vehicle 2 as "a mobile object". The HUD device 1 includes a projection unit 10 and a combiner 20. In the following description, "a top-bottom direction" and "a side-to-side direction" represent, respectively, "a vertical direction" and "a horizontal direction" of the vehicle 2 on a level ground.

The projection unit 10 is stored inside an instrument panel 3 in the vehicle 2. The projection unit 10 has a projection device 11 and an optical system 12. The projection device 11 is, for example, a liquid crystal projector or scanning projector. The projection device 11 forms and projects a display light image 100. The optical system 12 is formed of at least one optical member, for example, a reflecting mirror. The optical system 12 guides a light flux of the display light image 100 projected from the projection device 11 to an outside of the instrument panel 3 by, for example, reflection. When the light flux is guided by the optical system 12 as is indicated by alternate long and short dash lines of FIG. 1, the display light image 100 is projected onto the combiner 20.

Figure 2:
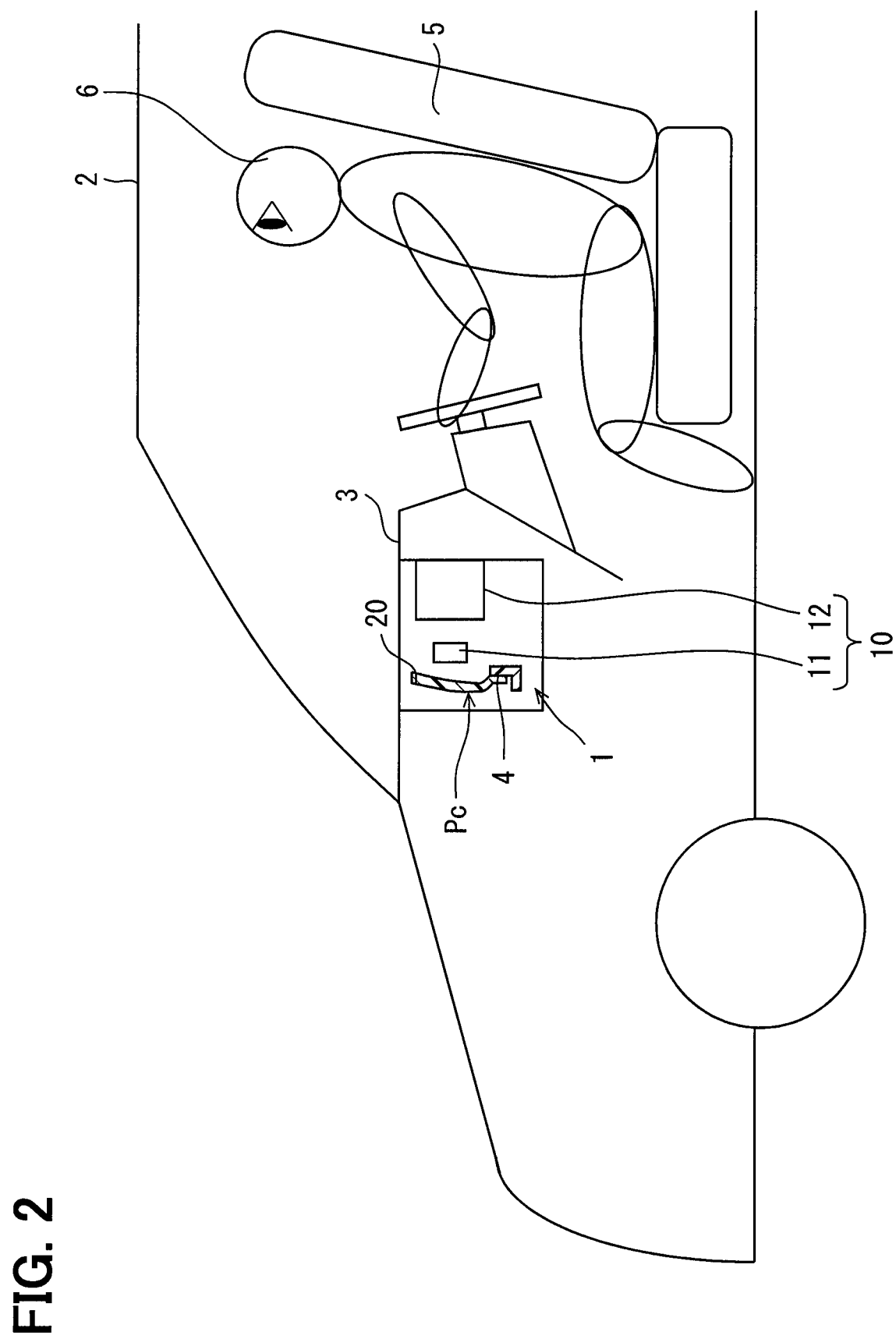
FIG. 2 is a schematic sectional view used to describe a state different from a state of FIG. 1.

The combiner 20 is molded of resin into a plate shape. The combiner 20 is fastened to a base 4 provided to the instrument panel 3 in the vehicle 2. The combiner 20 can be driven together with the base 4. The base 4 is driven between a disable position Pc shown in FIG. 2 at which the combiner 20 is stored inside the instrument panel 3 and an enable position Pp of FIG. 1 at which the combiner 20 is exposed outside the instrument panel 3. The base 4 is driven by, for example, a switching operation by an occupant 6 in the vehicle 2.

The combiner 20 has a front reflection surface 21 and a back reflection surface 22, and when set at the enable position Pp, the front reflection surface 21 faces a driver's seat 5 in the vehicle 2, and a back reflection surface 22 faces opposite to the driver's seat 5 (that is, outward ahead of the vehicle 2). The combiner 20 is made of, for example, transparent resin or translucent resin, such as acrylic resin, and therefore exerts a light-transmitting function between the both reflection surfaces 21 and 22 and a light-reflecting function on the respective reflection surfaces 21 and 22. The combiner 20 at the enable position Pp enables visual confirmation of an external image outside the vehicle 2 by the occupant 6 seated in the driver's seat 5 in the vehicle 2 by transmitting a light flux from the external image.

The display light image 100 is projected onto the combiner 20 at the enable position Pp from the optical system 12 of the projection unit 10. A light flux of the display light image 100 is reflected on the respective reflection surfaces 21 and 22 of the combiner 20 as is indicated by an alternate long and short dash line of FIG. 1. Hence, the light flux reflected on the respective reflection surfaces 21 and 22 goes incident on pupils of the occupant 6 seated in the driver's seat 5 in the vehicle 2. Consequently, the display light image 100 is visually confirmed by the occupant 6 as a virtual image formed outside and ahead of the vehicle 2 beyond the combiner 20. In short, the display light image 100 is displayed as a virtual image visible to the occupant 6 in the vehicle 2. The combiner 20 at the enable position Pp thus enables visual confirmation of the display light image 100 by the occupant 6. Meanwhile, when the combiner 20 is at the disable position Pc of FIG. 2 and hidden inside the instrument panel 3, the display light image 100 is not projected from the projection device 11 and is therefore not projected onto the combiner 20. Hence, visual confirmation of the display light image 100 by the occupant 6 is disabled.

Detailed Configuration of Combiner

The following will describe a detailed configuration of the combiner 20. As are shown in FIGS. 3 and 4, the combiner 20 includes a projection main body 25 and a pair of fastening projections 26.

The projection main body 25 has an outer contour of substantially a rectangular curved plate shape. The projection main body 25 curves in both of the top-bottom direction and the side-to-side direction. That is, a curvature is given to the projection main body 25 in both of the top-bottom direction and the side-to-side direction. The projection main body 25 thus forms the front reflection surface 21 in a shape of a concave surface, which is curved inwardly to an opposite side to the driver's seat 5 when set at the enable position Pp, to be more exact, a freeform surface, such as an aspherical surface. Meanwhile, the projection main body 25 forms the back reflection surface 22 in a shape of a convex surface, which is curved outwardly to the opposite side to the driver's seat 5 when set at the enable position Pp, to be more exact, a freeform surface, such as an aspherical surface. In the present embodiment, the both reflection surfaces 21 and 22 make the projection main body 25 thicker from bottom to top by sandwiching a wedge angle which widens upward.

Figure 4:
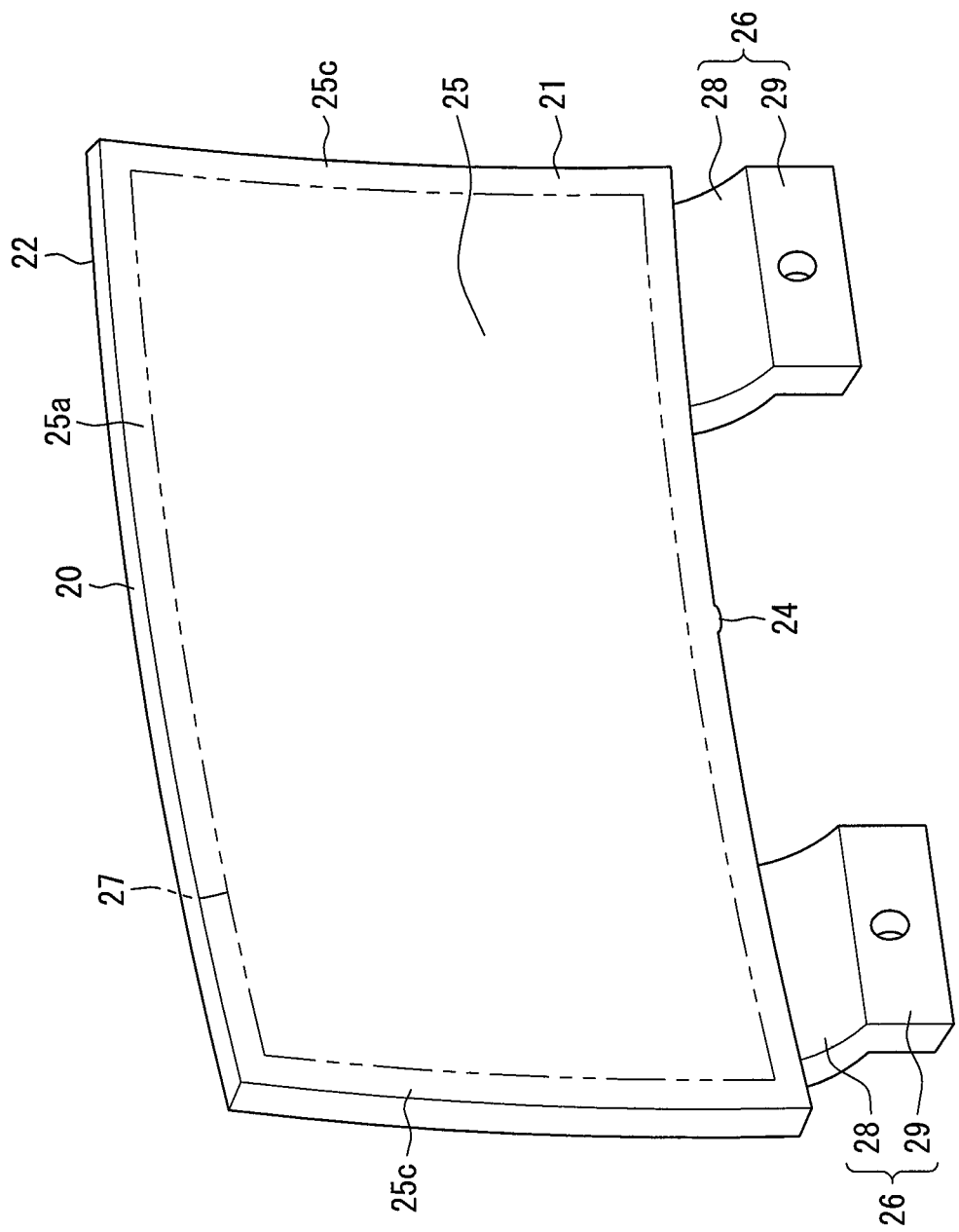
FIG. 4 is a schematic perspective view of the combiner of FIG. 3.

As is schematically indicated by an alternate long and two short dashes line of FIG. 4, a projection region 27 is set in substantially a rectangular portion of the projection main body 25 except for an outer peripheral rim 25a. The display light image 100 is projected across the entire projection region 27 at the enable position Pp shown in FIG. 1 from the projection unit 10. That is, the projection region 27 is set as a portion where the display light image 100 is actually projected in the projection main body 25.

Figure 3:
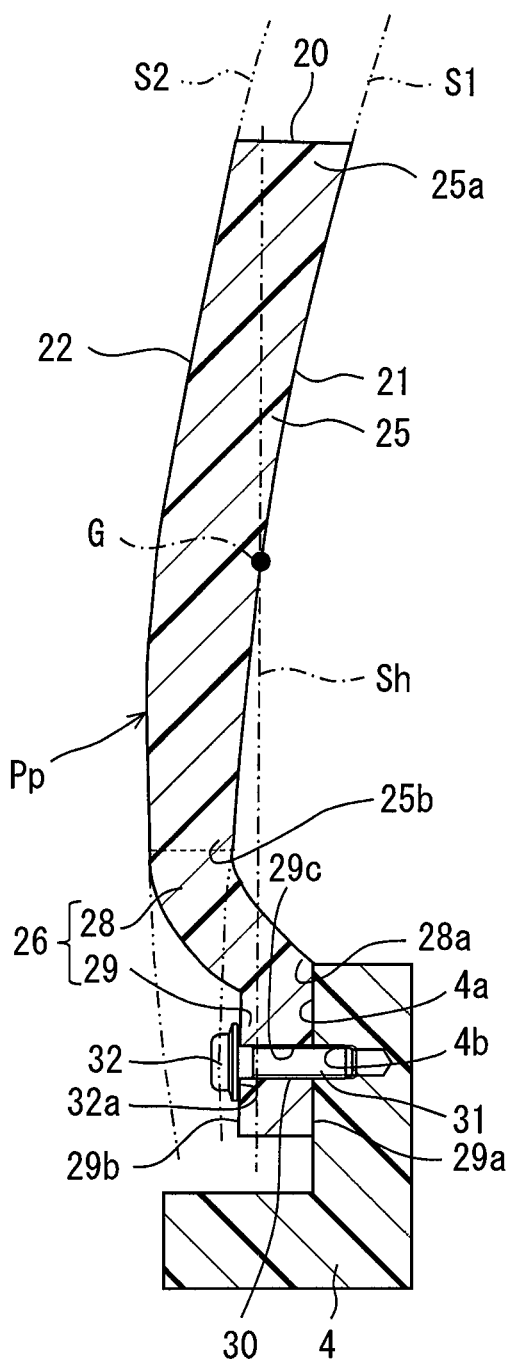
FIG. 3 is an enlarged schematic sectional view of the combiner of FIG. 1.

As are shown in FIGS. 3 and 4, the respective fastening projections 26 are integrally molded with the projection main body 25 from resin. An outer shape of the fastening projections 26 is substantially a rectangular bent plate shape. The fastening projections 26 respectively protrude from the projection main body 25 at two points spaced in the side-to-side direction. The fastening projections 26 are fastened to the base 4 by fastening members 30 provided on a one-to-one correspondence basis 4 as is shown in FIG. 3 and can be therefore driven together with the base 4 and the projection main body 25. The fastening protrusions 26 fastened to the base 4 as above protrude downward from the projection main body 25 on the outside of the instrument panel 3 when set at the enable position Pp and are therefore supported on the fastened-base 4 from below.

Figure 5:
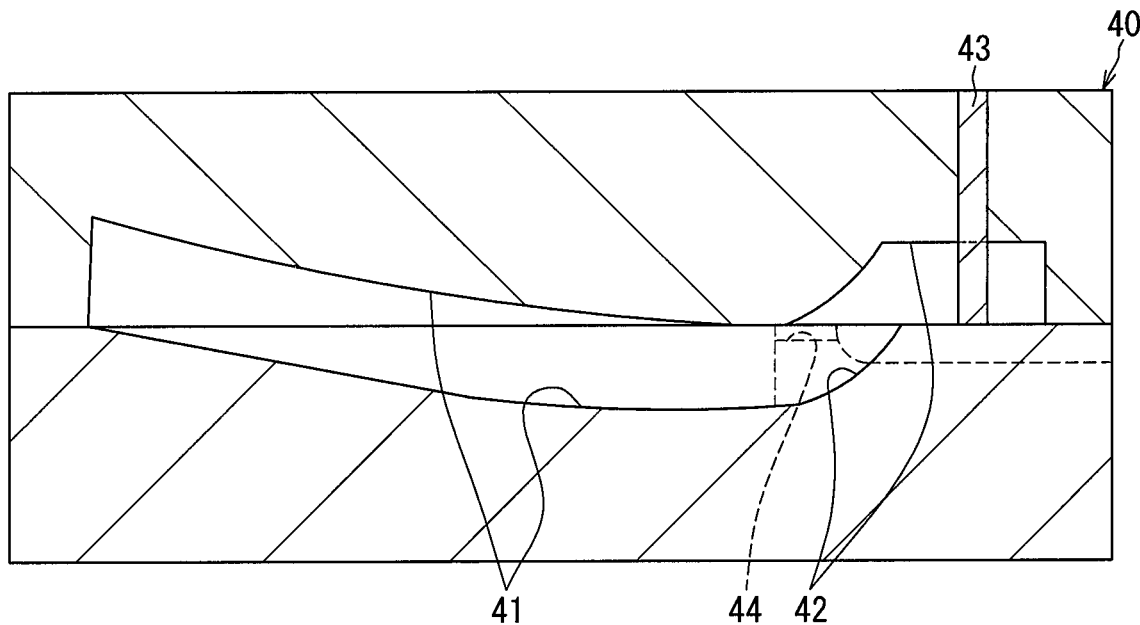
FIG. 5 is a schematic sectional view showing a manufacturing method of the combiner of FIG. 1.
Figure 6:
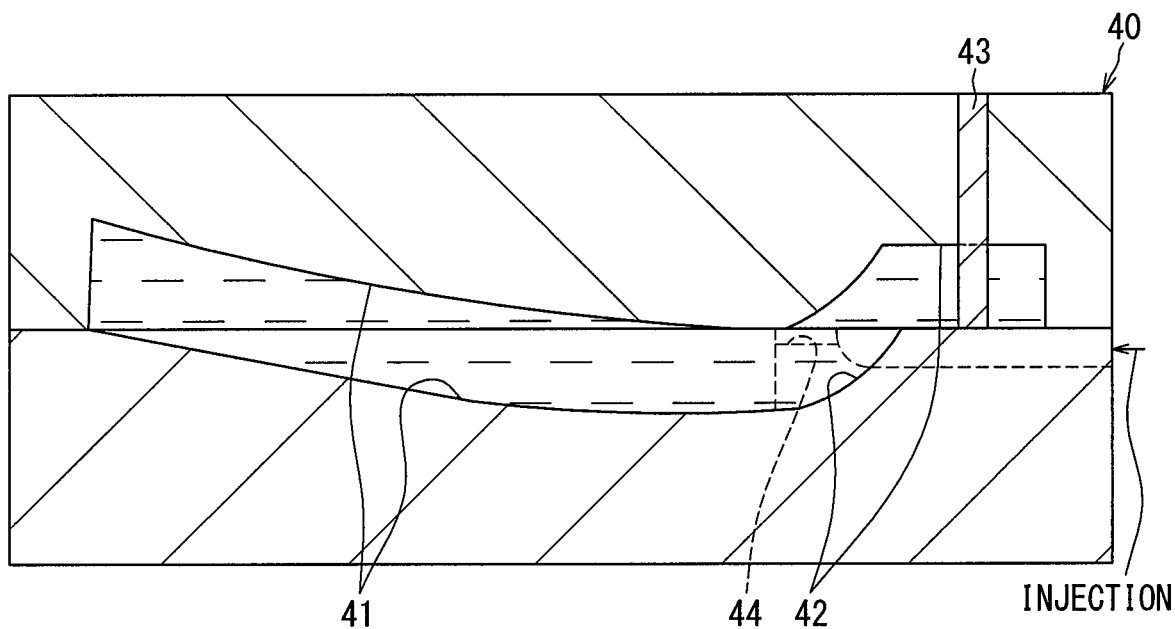
FIG. 6 is another schematic sectional view showing the manufacturing method of the combiner of FIG. 1.
Figure 7:
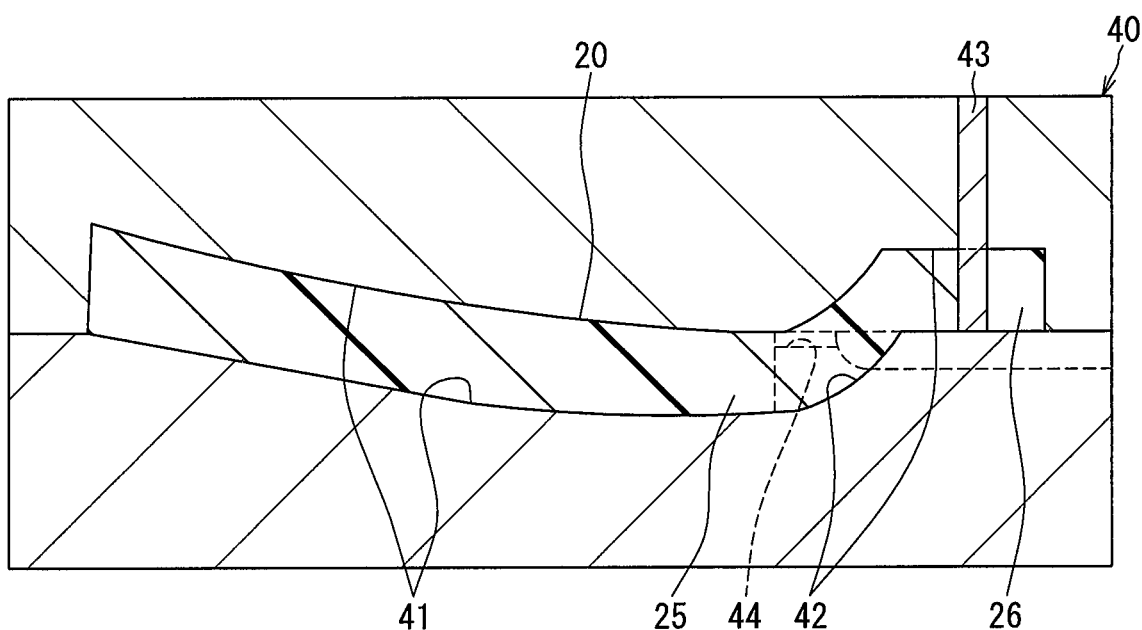
FIG. 7 is still another schematic sectional view showing the manufacturing method of the combiner of FIG. 1.

The combiner 20 with the fastening protrusions 26 protruding from the projection main body 25 as above is manufactured by a method using a mold die 40 as are shown in FIGS. 5 through 7. More specifically, as is shown in FIG. 5, a main body cavity 41 to mold the projection main body 25 from resin and projection cavities 42 to mold the respective fastening protrusions 26 from resin are defined first by closing the mold die 40. Slide cores 43 are provided to the respective protrusion cavities 42 at positions corresponding to insertion holes 29c (see, for example, FIG. 3) in which to insert the fastening members 30 as will be described below.

Subsequently, as is shown in FIG. 6, molten resin is injected into the main body cavity 41 from a gate 44 provided between the projection cavities 42 in the mold die 40. Eventually, the molten resin flowing inside the main body cavity 41 is injected into the respective protrusion cavities 42 from the cavity 41. After the molten resin is cooled and solidified, the resulting resin-molded combiner 20 as is shown in FIG. 7 is released from the mold die 40. The released combiner 20 has the projection main body 25 provided with a gate cut portion 24 corresponding to the gate 44 between the fastening protrusions 26 as is shown in FIG. 4.

As are shown in FIGS. 3 and 4, each of the fastening protrusions 26 fastened to the base 4 with the fastening members 30 provided on a one-to-one correspondence basis has a joint portion 28 and a fastening portion 29. In the present embodiment, configurations of the fastening protrusions 26 are same and configurations of the fastening members 30 are also same. Hence, the following will describe a configuration of one fastening protrusion 26 and a configuration of one fastening member 30 shown in FIG. 3.

The joint portion 28 of the fastening protrusion 26 protrudes from a lower edge 25b of the outer peripheral rim 25a of the projection main body 25 at the enable position Pp. The joint portion 28 protrudes downward from the lower edge 25b while inclining more toward the driver's seat 5 when set at the enable position Pp. Given a pair of virtual extended and curved surfaces S1 and S2 extended, respectively, along the reflection surfaces 21 and 22 to a protruding side of the fastening protrusion 26. Then, the projection main body 25 and the fastening portion 29 are joined by the joint portion 28 protruding from the lower edge 25b in a portion where both of the virtual extended and curved surfaces S1 and S2 pass through.

The fastening portion 29 of the fastening protrusion 26 protrudes downward from a lower end 28a of the joint portion 28 at the enable position Pp. The fastening portion 29 at the enable position Pp protrudes straight downward from the lower edge 28a. Given a virtual vertical surface Sh extending in the top-bottom direction. Then, the fastening portion 29 is located on the virtual vertical surface Sh passing a center of gravity, G, of the projection main body 25 alone and both side edges 25c of the outer peripheral rim 25a of the projection main body 25 in the side-to-side direction. Also, the fastening portion 29 forms a protruding surface 29a and a fastening surface 29b, respectively, on one side and the other side sandwiching the virtual vertical surface Sh passing the center of gravity, G. The protruding surface 29a and the fastening surface 29b are formed in a planar shape at positions on neither of the virtual extended and curved surfaces S1 and S2. In a state where the fastening portion 29 is fastened to the base 4, substantially the entire protruding surface 29a is in surface contact with a planar base surface 4a of the base 4.

The fastening member 30 is made of metal. The fastening member 30 has a screw portion 31 and a head portion 32. The screw portion 31 is a male screw. The screw portion 31 is inserted into the insertion hole 29c penetrating through the fastening portion 29 from the protrusion surface 29a to the fastening surface 29b. The screw portion 31 is screwed into a screw hole 4b provided to the base 4.

The head portion 32 is of a disc shape larger than the screw portion 31. The head portion 32 forms a planar seat surface 32a by using an annular end face on a side where the screw portion 31 is present. In a state where the fastening portion 29 is fastened to the base 4 by inserting the screw portion 31 into the insertion hole 29c and screwing the screw portion 31 into the screw hole 4b, substantially the entire seat surface 32a is in surface contact with the fastening surface 29b of the fastening portion 29.

Functions and Effects

The following will describe functions and effects of the present embodiment described above.

According to the present embodiment, the projection main body 25 of the combiner 20 forms the reflection surfaces 21 and 22 displaying a virtual image by reflecting the display light image 100 projected onto the projection region 27 in a shape of a curved surface. In the combiner 20 of the present embodiment, each fastening protrusion 26 protruding from the projection main body 25 and fastened to the base 4 in the vehicle 2 with the fastening member 30 forms the planar fastening surface 29b in surface contact with the seat surface 32a. When configured in the manner as above, not only distortion hardly occurs in the fastening protrusion 26 which receives fastening stress at the planar fastening surface 29b in surface contact with the planar seat surface 32a of the fastening member 30, but also such fastening stress hardly propagates to the projection main body 25 from which the fastening protrusion 26 protrudes. Hence, because occurrence of distortion in the projection main body 25 where the projection region 27 is set can be restricted, clear visibility can be ensured for the display light image 100 reflected on the both reflection surfaces 21 and 22 in the projection region 27 and displayed as a virtual image.

The fastening portion 29 of the fastening protrusion 26 forms the planar fastening surface 29b at a position on neither of the virtual extended and curved surfaces S1 and S2 extended, respectively, along the reflection surfaces 21 and 22 to the protruding side of the fastening protrusion 26. When configured in the manner as above, fastening stress received by the fastening protrusion 26 at the planar fastening surface 29b in surface contact with the planar seat surface 32a of the fastening member 30 has a lower propagation rate from a point on neither of the virtual extended and curved surfaces S1 and S2 to the projection main body 25 at a farthest possible location. Hence, reliability of the effect of ensuring clear visibility of the display light image 100 by restricting distortion in the projection main body 25 can be enhanced.

In the fastening protrusion 26, the projection main body 25 and the fastening portion 29 are joined by the joint portion 28 in a portion where both of the virtual extended and curved surfaces S1 and S2, respectively, along the reflection surfaces 21 and 22 pass through. Owing to the configuration as above, a stress propagation rate from the fastening surface 29b to the projection main body 25 can be reduced by providing the planar fastening surface 29b of the fastening portion 29 at a point certainly present on neither of the virtual extended and curved surfaces S1 and S2. Hence, high reliability of the effect of ensuring clear visibility of the display light image 100 by restricting distortion in the projection main body 25 can be assured.

The fastening portion 29 of the fastening protrusion 26 at the enable position Pp is located on the virtual vertical surface Sh extending in the top-bottom direction and passing the center of gravity, G, of the projection main body 25. In a state where the planar fastening surface 29b is in surface contact with the planar seat surface 32a of the fastening member 30 and the fastening protrusion 26 is therefore supported on the base 4, rattling caused by vibrations of the vehicle 2 can be reduced to a lesser extent for the projection main body 25 with respect to which the virtual vertical surface Sh where the fastening portion 26 is located passes the center of gravity, G. In the projection main body 25 with respect to which the virtual vertical surface Sh passes the center of gravity, G, rattling caused particularly by vibrations of the moving vehicle 2 in a front-rear direction can be reduced to a lesser extent. Hence, an inconvenience that rattling deteriorates visibility of the display light image 100 can be avoided. In the present embodiment described as above, the projection main body 25 and the fastening portion 29 are joined by the joint portion 28 and spaced apart from each other. Hence, flexibility of design to locate the fastening portion 29 on the virtual vertical surface Sh passing the center of gravity, G, of the projection main body 25 can be increased.

The fastening protrusions 26 protruding downward from the projection main body 25 at multiple points in the side-to-side direction are supported by the fastened-base 4 from below when set at the enable position Pp. Rattling of the projection main body 25 caused by vibrations of the vehicle 2 can be thus reduced to a lesser extent. Hence, an inconvenience that rattling deteriorates visibility of the display light image 100 can be avoided.

The fastening protrusions 26 are driven together with the base 4 and the projection main body 25 between the enable position Pp at which visual confirmation of the display light image 100 by the occupant 6 is enabled and the disable position Pc at which the visual confirmation is disabled. Accordingly, rattling of the projection main body 25 caused by vibrations of the base 4 is concerned. However, according to the principle described above, rattling of the projection main body 25 caused not only by vibrations of the vehicle 2 but also by vibrations of the base 4 can be reduced to a lesser extent. Hence, an inconvenience that rattling deteriorates visibility of the display light image 100 can be avoided.

The projection main body 25 integrally molded with the fastening protrusions 26 from resin has the gate cut portion 24. Owing to the configuration as above, in the mold die 40 in which resin flows into the main body cavity 41 to mold the projection main body 25 from resin from the gate 44 corresponding to the gate cut portion 24, the resin is hardly blocked by the slide cores 43 corresponding to the insertion portions of the fastening members 30. Hence, an inconvenience that poor molding due to blocking of a flow of resin as above, for example, a weld line or shrinkage, occurring in the projection main body 25 deteriorates visibility of a display light image can be avoided.

Not only distortion caused by fastening stress hardly occurs in the fastening protrusions 26 both at the planar fastening surface 29b in surface contact with the planar seat surface 32a of the fastening member 30 and the planar protruding surface 29a in surface contact with the planar base surface 4a of the base 4, but also such fastening stress hardly propagates to the projection main body 25. Hence, reliability of the effect of ensuring clear visibility of the display light image 100 by restricting distortion in the projection main body 25 can be enhanced.

OTHER EMBODIMENTS

While the above has described one embodiment of the present disclosure, an interpretation of the present disclosure is not limited to the embodiment above and the present disclosure can be carried out in various other embodiments within the scope of the present disclosure.

Figure 8:
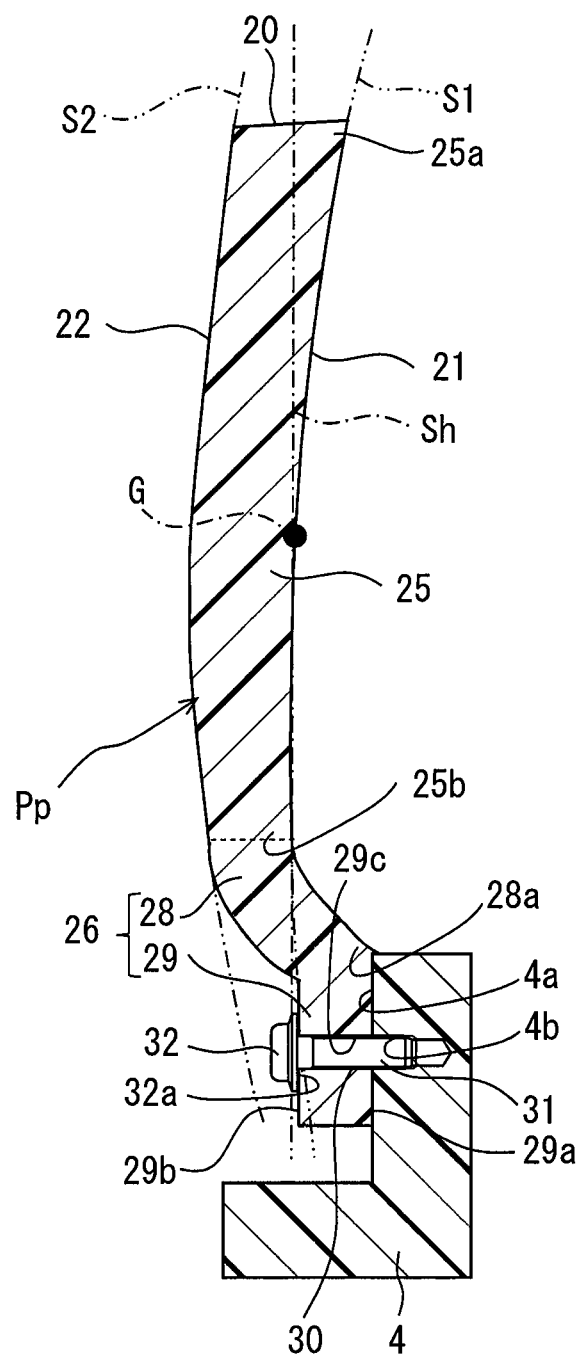
FIG. 8 is a schematic sectional view of modifications of an example of FIG. 3.

More specifically, in a first modification, as is shown in FIG. 8, the fastening surface 29b of the fastening protrusion 26 may be formed at a point where at least one of the virtual extended and curved surfaces S1 and S2 passes through. In the first modification of FIG. 8, the fastening surface 29b of the fastening protrusion 26 is formed on the virtual extended and curved surface S1 along the front reflection surface 21 on the side where the driver's seat 5 is present.

Figure 9:
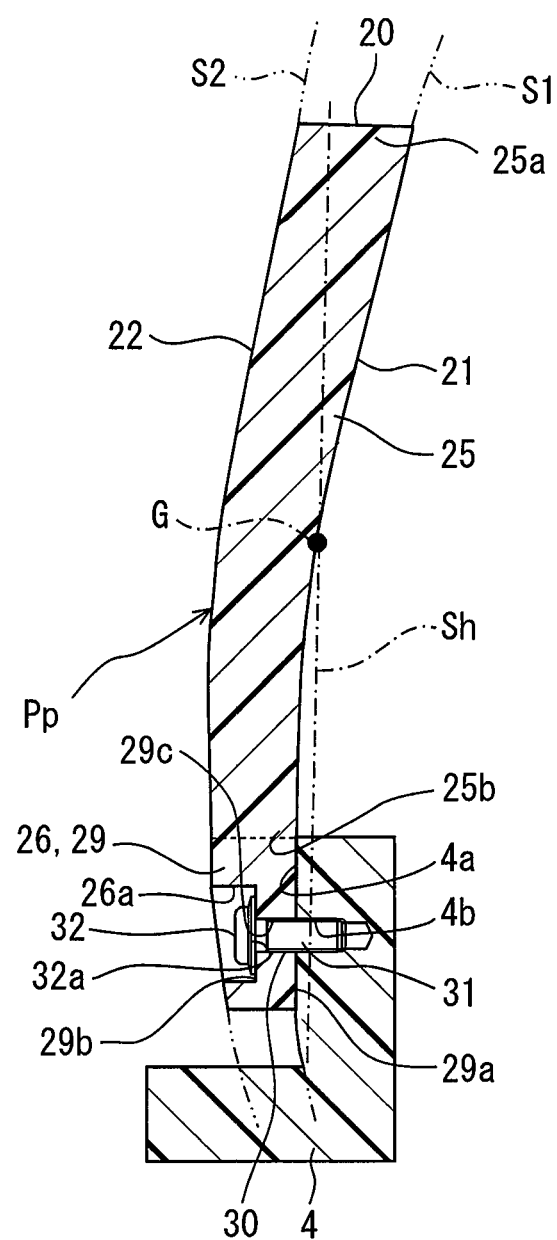
FIG. 9 is a schematic sectional view of other modifications of the example of FIG. 3.

In a second modification, as is shown in FIG. 9, the fastening surface 29b of the fastening protrusion 26 may be formed on a planar bottom surface of a recessed portion 26a at a position outside the virtual extended and curved surface S2 along the back reflection surface 22 on a side opposite to the driver's seat 5. In a third modification, as is shown in FIG. 10, the fastening surface 29b of the fastening protrusion 26 may be formed of a planar plate surface at a point continued from the virtual extended and curved surface S2 along the back reflection surface 22 on the side opposite to the driver's seat 5.

Figure 10:
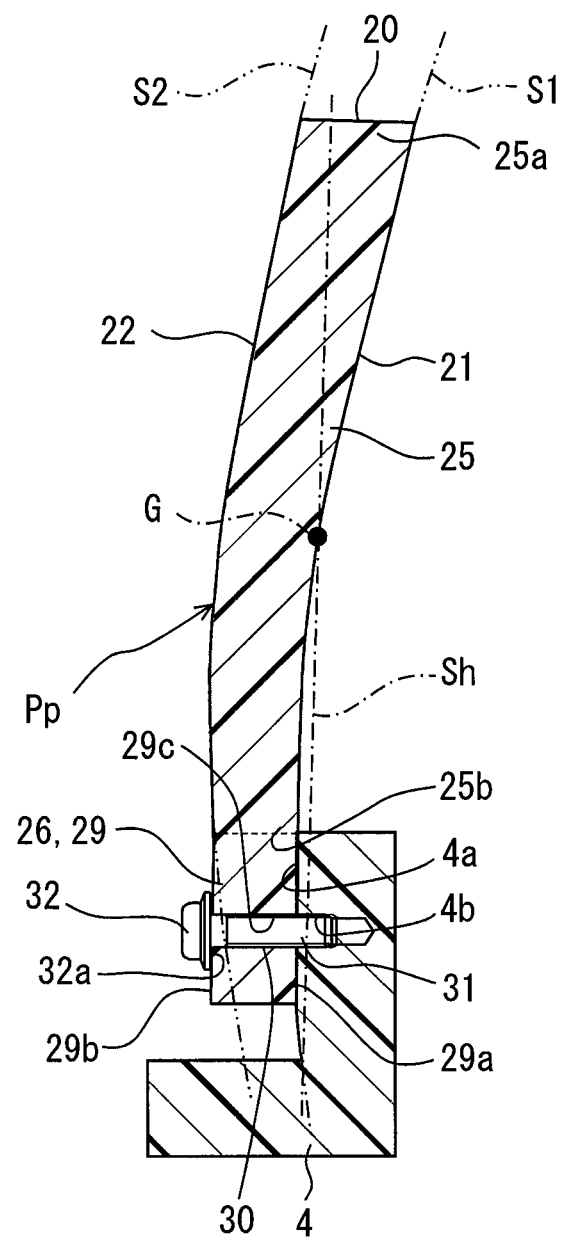
FIG. 10 is a schematic sectional view of still other modifications of the example of FIG. 3.

In a fourth modification, as are shown in FIGS. 9 and 10, the protruding surface 29a of the fastening protrusion 26 may be formed at a point where at least one of the virtual extended and curved surfaces S1 and S2 passes through. In the fourth modification of FIGS. 9 and 10, the protruding surface 29a of the fastening protrusion 26 is formed on the virtual extended and curved surface S1 along the front reflection surface 21 on the side where the driver's seat 5 is present.

In a fifth modification, as are shown in FIGS. 9 and 10, the base surface 4a of the base 4 may be formed in a shape of a curved surface and the protruding surface 29a of the fastening protrusion 26 may be formed in a shape of a curved surface complementing the base surface 4a. In a sixth modification, as are shown in FIGS. 8 through 10, the fastening portion 29 of the fastening protrusion 26 may be provided at a position outside the virtual vertical surface Sh passing the center of gravity, G, of the projection main body 25 alone.

In a seventh modification, as are shown in FIGS. 9 and 10, the fastening portion 29 may produce directly from the projection main body 25 by omitting the joint portion 28 from the fastening protrusion 26. In an eighth modification, the joint portion 28 may protrude downward from the lower edge 25b of the projection main body 25 while inclining more to the opposite side to the driver's seat 5.

In a ninth modification, the fastening protrusion 26 may protrude from the projection main body 25 at one or three or more points in the side-to-side direction. In a tenth modification, the fastening protrusion 26 may protrude from the projection main body 25 at one or more than one point in the top-bottom direction.

In an eleventh modification, the base 4 may be fixed to the instrument panel 3. In a twelfth modification, the base 4 may be rotationally driven between the enable position Pp and the disable position Pc about a rotational axis.

In a thirteenth modification, a part of the combiner 20 may be made of a material other than resin. In a fourteenth modification, the fastening protrusion 26 having the gate cut portion 24 may be adopted. In a fifteenth modification, the projection region 27 may be provided across the entire projection main body 25.

In a sixteenth modification, the projection main body 25 may be set to substantially a constant plate thickness in the entire projection region 27 by omitting a wedge angle between the reflection surfaces 21 and 22. In a seventeenth modification, at least one of the reflection surfaces 21 and 22 may be curved only in one of the top-bottom direction and the side-to-side direction.

In an eighteenth modification, the display light image 100 may be projected directly onto the combiner 20 from the projection device 11 without providing the optical system 12 to the projection unit 10. In a nineteenth modification, the present disclosure may be applied to an HUD device and a combiner mounted to various types of "mobile object" other than the vehicle 2, such as a ship and an air plane.

The combiner 20 described above is fastened to the base 4 in the mobile object 2 with the fastening member 30 forming the planar seat surface 32a and displays a display light image as a virtual image visible to the occupant 6 in the mobile object when the display light image 100 is projected from the projection unit 10. The projection main body 25 is set with the projection region 27 and forms the both reflection surfaces 21 and 22 displaying a virtual image by reflecting the display light image projected onto the projection region in a shape of a curved surface. A fastening projection forms the planar fastening surface 29b in surface contact with the seat surface as the fastening protrusion 26 protruding from the projection main body and fastened to the base with the fastening member inserted into the fastening protrusion 26.

The head-up display device 1 includes the combiner 20 fastened to the base 4 in the mobile object 2 with the fastening member 30 forming the planar seat surface 32a and displays a display light image as a virtual image visible to the occupant 6 in the mobile object by projecting the display image 100 onto the combiner from the projection unit 10. The combiner includes the projection main body 25 and the fastening protrusion. The projection main body 25 is set with the projection region 27 and forms both reflection surfaces 21 and 22 displaying a virtual image by reflecting the display light image projected onto the projection region in a shape of a curved surface. The fastening protrusion forms the planar fastening surface 29b in surface contact with the seat surface as the fastening protrusion 26 protruding from the projection main body and fastened to the base with the fastening member inserted into the fastening protrusion 26.

According to the configurations as above, the projection main body of the combiner forms the both reflection surfaces displaying a virtual image by reflecting the display light image projected onto the projection region in a shape of a curved surface. According to the combiners of the first and second disclosures, the fastening protrusion protruding from the projection main body and fastened to the base in the mobile object with the fastening member forms the planar fastening surface in surface contact with the seat surface. Owing to the configuration as above, not only distortion hardly occurs in the fastening protrusion receiving fastening stress at the planar fastening surface in surface contact with the planar seat surface of the fastening member, but also such fastening stress hardly propagates to the projection main body from which the fastening protrusion protrudes. Consequently, because an occurrence of distortion in the projection main body where the projection region is set can be restricted, clear visibility can be ensured for the display light image reflected on the both reflection surfaces in the projection region and displayed as a virtual image.

While the present disclosure has been described according to the embodiments above, it should be understood that the present disclosure is not limited to the embodiments above and structures thereof. The present disclosure includes various modifications and alterations within the equivalent scope. In addition, various combinations and embodiments, as well as other combinations further including one element alone and more or less than one element are also within the scope and the idea of the present disclosure.

What is claimed is:

1. A combiner configured to be fastened to a base in a mobile object with a fastening member having a planar seat surface and to display a display light image as a virtual image visible to an occupant in the mobile object when the display light image is projected from a projection unit, the combiner comprising:
    a projection main body set with a projection region and having reflection surfaces each in a shape of a curved surface and configured to display a virtual image by reflecting the display light image projected onto the projection region; and
    a fastening protrusion having a planar fastening surface configured to be in contact with the seat surface, wherein
    the fastening protrusion protrudes from the projection main body and is configured to be fastened to the base with the fastening member inserted into the fastening protrusion,
    a pair of virtual extended and curved surfaces extended along the respective reflection surfaces to a protruding side of the fastening protrusion, the fastening protrusion has a fastening portion having the fastening surface at a position outside both of the virtual extended and curved surfaces, and
    a virtual vertical surface extending in a top-bottom direction, the fastening portion is on the virtual vertical surface passing a center of gravity of the projection main body and is located on a lower side of the projection main body in a vertical direction, wherein
    the base has a planar base surface; and
    the fastening surface is located at a position between the planar base surface and a front virtual extended reflection surface along a front reflection surface.

2. The combiner according to claim 1, wherein:
    the fastening protrusion has a joint portion joining the projection main body with the fastening portion in a portion where at least one of the virtual extended and curved surfaces passes through.

3. The combiner according to claim 1, wherein:
    the fastening protrusion protrudes downward from the projection main body at more than one point in a side-to-side direction and is configured to be supported on the base from below.

4. The combiner according to claim 3, wherein:
    the base is configured to be driven between an enable position at which visual confirmation of the display image by the occupant is enabled and a disable position at which the visual confirmation is disabled; and
    the fastening protrusion is configured to be driven together with the base and the projection main body.

5. The combiner according to claim 1, wherein:
    the projection main body and the fastening protrusion are integrally molded of resin; and
    the projection main body has a gate cut portion.

6. The combiner according to claim 1, wherein:
    the base has a planar base surface; and
    the fastening protrusion has a planar protruding surface configured to be in surface contact with the base surface.

7. The combiner according to claim 1, wherein:
    the planar fastening surface is in parallel with the virtual vertical surface.

8. The combiner according to claim 1, wherein:
    the fastening member is screwed to the fastening portion.

9. The combiner according to claim 1, wherein:
    the fastening surface is located at a position entirely outside both of the virtual extended and curved surfaces.

10. A head-up display device including a combiner configured to be fastened to a base in a mobile object with a fastening member having a planar seat surface and to display a display light image as a virtual image visible to an occupant in the mobile object by projecting the display light image onto the combiner from a projection unit, wherein
    the combiner includes:
    a projection main body set with a projection region and having reflection surfaces each in a shape of a curved surface and configured to display a virtual image by reflecting the display light image projected onto the projection region; and a fastening protrusion having a planar fastening surface configured to be in surface contact with the seat surface, wherein the fastening protrusion protrudes from the projection main body and is configured to be fastened to the base with the fastening member inserted into the fastening protrusion, a pair of virtual extended and curved surfaces extended along the respective reflection surfaces to a protruding side of the fastening protrusion, the fastening protrusion has a fastening portion having the fastening surface at a position outside both of the virtual extended and curved surfaces, and a virtual vertical surface extending in a top-bottom direction, the fastening portion is on the virtual vertical surface passing a center of gravity of the projection main body and is located on a lower side of the projection main body in a vertical direction, wherein the base has a planar base surface; and the fastening surface is located at a position between the planar base surface and a front virtual extended reflection surface along a front reflection surface.

11. The head-up display device according to claim 10, wherein:

the planar fastening surface is in parallel with the virtual vertical surface.

12. The head-up display device according to claim 10, wherein:

the fastening member is screwed to the fastening portion.

13. The head-up display device according to claim 10, wherein:

the fastening surface is located at a position entirely outside both of the virtual extended and curved surfaces.

\* \* \* \* \*